United States Patent
Michael (10) Patent No.: US 11,032,069 B2
(45) Date of Patent: *Jun. 8, 2021

(54) METHODS AND SYSTEMS OF SECURELY TRANSFERRING DATA

(71) Applicant: iStorage Limited, Middlesex (GB)

(72) Inventor: John Michael, London (GB)

(73) Assignee: iStorage Limited, Middlesex (GB)

( * ) Notice: Subject to any disclaimer, the term of this patent is extended or adjusted under 35 U.S.C. 154(b) by 84 days.

This patent is subject to a terminal disclaimer.

(21) Appl. No.: 16/675,963

(22) Filed: Nov. 6, 2019

(65) Prior Publication Data

US 2020/0145202 A1    May 7, 2020

(30) Foreign Application Priority Data

Nov. 7, 2018    (GB) ...................................... 1818156

(51) Int. Cl.
*H04L 9/08*    (2006.01)
(52) U.S. Cl.
CPC .......... *H04L 9/0825* (2013.01); *H04L 9/0869* (2013.01); *H04L 9/0897* (2013.01)
(58) Field of Classification Search
CPC ........ G06F 21/34; G06F 21/44; G06F 21/606; G06F 13/4282; G06F 21/32;
(Continued)

(56) References Cited

U.S. PATENT DOCUMENTS

| 7,409,550 B2 * | 8/2008 | Avramopoulos ...... H04W 12/50 713/171 |
| 9,720,700 B1 | 8/2017 | Brown et al. |

(Continued)

FOREIGN PATENT DOCUMENTS

| EP | 2400754 A2 | 12/2011 |
| GB | 2439838 A | 1/2008 |

(Continued)

OTHER PUBLICATIONS

Search Query Report from IP.com (performed Mar. 19, 2021) (Year: 2021).*

(Continued)

*Primary Examiner* — Sharon S Lynch
(74) *Attorney, Agent, or Firm* — Nixon Peabody LLP (57) ABSTRACT

The present disclosure relates to a method and system for securely transferring master keying material between to a slave dongle (12). Each slave dongle (12) is connected to a data transfer system. The slave dongle (12) contains a public key and a private key and the data transfer system holds a master keying material source that contains master keying material to be transferred securely to the slave dongle (12). The slave dongle's public key is transferred to the master keying material source. The master keying material source encrypts the master keying material with the slave dongle's public key to produce an encrypted master keying material. The encrypted master keying material is sent to the slave dongle (12) and the slave dongle (12) decrypts the encrypted master keying material with the slave dongle's private key. This allows multiple users, each having a slave dongle (12*a-n*) that has been configured in this manner, to use the same master keying material to securely communicate with one another.

17 Claims, 5 Drawing Sheets

(58) Field of Classification Search
CPC .... G06F 21/602; G06F 21/62; G06F 21/6218; G06F 21/72; G06F 21/78; G06F 2213/0042; G06F 2221/2107; H04L 63/06; H04L 9/0869; H04L 9/0897; H04L 9/3231; H04L 2209/16; H04L 63/0428; H04L 63/0853; H04L 63/0861; H04L 9/0825; H04L 9/0861; H04L 9/14; H04L 9/3073; H04L 9/3226; H04L 9/3234; H04L 9/3242; H04L 9/3247; H04L 9/3268

See application file for complete search history.

(56) References Cited

U.S. PATENT DOCUMENTS

| | | | | |
|---|---|---|---|---|
| 10,129,020 | B2* | 11/2018 | Le Saint | H04L 9/0819 |
| 10,313,110 | B2* | 6/2019 | Le Saint | H04W 12/041 |
| 10,666,428 | B2* | 5/2020 | Le Saint | H04L 9/0819 |
| 2003/0070078 | A1 | 4/2003 | Nosrati et al. | |
| 2003/0133576 | A1 | 7/2003 | Grumiaux | |
| 2003/0233573 | A1 | 12/2003 | Phinney | |
| 2004/0153642 | A1* | 8/2004 | Plotkin | H04L 9/0897 713/150 |
| 2005/0210249 | A1* | 9/2005 | Lee | H04L 63/0823 713/168 |
| 2006/0036860 | A1* | 2/2006 | Avramopoulos | H04W 12/50 713/171 |
| 2006/0259579 | A1 | 11/2006 | Beverly | |
| 2007/0113078 | A1* | 5/2007 | Witt | G06F 21/602 713/165 |
| 2008/0126802 | A1* | 5/2008 | Li | H04L 9/3234 713/168 |
| 2008/0184341 | A1* | 7/2008 | Sebesta | H04L 63/0807 726/4 |
| 2008/0263363 | A1* | 10/2008 | Jueneman | H04L 63/061 713/184 |
| 2011/0022856 | A1 | 1/2011 | Ureche et al. | |
| 2011/0113235 | A1* | 5/2011 | Erickson | G06F 21/34 713/152 |
| 2012/0121084 | A1* | 5/2012 | Tomlinson | H04L 9/304 380/30 |
| 2012/0331287 | A1* | 12/2012 | Bowman | H04W 12/35 713/156 |
| 2013/0151844 | A1 | 6/2013 | Messerschmidt | |
| 2014/0047513 | A1 | 2/2014 | van 'T Noordende | |
| 2014/0258707 | A1* | 9/2014 | Denny | H04L 67/06 713/150 |
| 2015/0156022 | A1* | 6/2015 | Asnaashari | G06F 21/34 713/172 |
| 2015/0200774 | A1* | 7/2015 | Le Saint | H04W 12/041 713/171 |
| 2015/0200918 | A1* | 7/2015 | Khokhar | H04L 9/0825 713/171 |
| 2016/0021068 | A1* | 1/2016 | Jueneman | H04L 9/0822 713/168 |
| 2016/0021109 | A1* | 1/2016 | Jueneman | H04L 9/085 713/165 |
| 2017/0222801 | A1* | 8/2017 | Le Saint | H04L 9/0844 |
| 2017/0230365 | A1* | 8/2017 | Poete | H04L 63/061 |
| 2018/0205538 | A1* | 7/2018 | Le Saint | H04W 12/041 |
| 2018/0205539 | A1* | 7/2018 | Le Saint | H04W 12/041 |
| 2019/0095604 | A1 | 3/2019 | Michael | |
| 2019/0260578 | A1* | 8/2019 | Le Saint | H04L 9/0844 |

FOREIGN PATENT DOCUMENTS

| | | |
|---|---|---|
| GB | 2566107 A | 3/2019 |
| WO | 2019048829 A1 | 3/2019 |

OTHER PUBLICATIONS

International Search Report for Application No. GB1818156.0, dated Apr. 30, 2019.
Great Britain Search Report for Application No. 1714256.3 dated Mar. 5, 2018.
International Search Report for PCT/GB2018/052458 dated Nov. 7, 2018.
Written Opinion for PCT/GB2018/052458 dated Nov. 7, 2018.
International Search Report for PCT/EP2019/080134, dated Dec. 13, 2019.
Written Opinion for PCT/EP2019/080134, dated Dec. 13, 2019.
Schneier, "Applied Cryptography", 1996, J. Wiley and sons, 2nd edition, pp. 31-33.
Office-Action in U.S. Appl. No. 16/120,721, dated Dec. 10, 2020.

* cited by examiner

METHODS AND SYSTEMS OF SECURELY TRANSFERRING DATA

The present disclosure relates to a method and system for securely transferring master keying material to a dongle, and a method and system for securely communicating data between users.

It is often desirable to transfer data securely between various users. Often, such data transfer will occur via a local network or via the Internet. When the data is sensitive it can be encrypted before transferring it over potentially insecure networks. Many businesses that use the internet to transfer data, either between employees of that company or with customers, make use of "public-key cryptography". In public-key cryptography, each user has a pair of cryptographic keys called the public key and the private key. The public key may be publically shared with anyone wishing to securely communicate with the key's owner, while the private key is for decrypting data that has been encrypted using that public key. When A wishes to communicate securely with B, A encrypts the message (data) using B's public key and sends the encrypted message to B. B then uses B's private key to decrypt the message. Advantageously, this method does not require the two users, A and B, to secretly exchange an encryption key with one another before communicating over insecure channels.

Another form of encryption is "symmetric-key encryption" in which the same encryption key is used for both encryption and decryption. In such a system, users A and B must first securely exchange the encryption key before they communicate with one another over insecure channels.

Symmetric-key encryption systems have advantages and disadvantages compared to public-key cryptography. Generally, symmetric-key systems are faster for encoding and decoding. In symmetric-key systems encrypted data can be transferred even if there is a possibility that the data will be intercepted. Since there is no key transmitted with the data, the chances of data being decrypted are lower than in public-key systems. Finally, only a recipient who has the key can decrypt the data. Thus senders can be confident that only an authorised recipient can decrypt the data. The main disadvantage of symmetric-key encryption is the requirement to provide the initial encryption key to all the users in a secure manner.

A session key is a single-use symmetric key that may be used for encrypting/decrypting all messages exchanged in a single communication session between two devices. After that communication session ends, the session key is no longer used for further communication between those two devices. Use of a session key can enhance the security of encrypted communications by limiting the amount of ciphertext (i.e. encrypted data) encrypted with a given key that an attacker has to work with, compared to a system where all communications use the same encryption key.

According to a first aspect, there is provided a method of securely transferring master keying material between a master keying material source and a slave dongle, wherein the slave dongle contains a public key and a private key, wherein the master keying material source is for providing master keying material, and wherein the master keying material is for allowing users of the dongles to securely access encrypted data; the method comprising: connecting the slave dongle to a data transfer system that contains the master keying material source; transferring the slave dongle's public key to the master keying material source using the data transfer system; encrypting the master keying material via an encryption process at the master keying material source, with the encryption process incorporating the use of the slave dongle's public key and hence producing encrypted master keying material at the master keying material source; transferring the encrypted master keying material to the slave dongle using the data transfer system; decrypting the encrypted master keying material at the slave dongle; and storing the master keying material at the slave dongle; such that a user of a first slave dongle containing the master keying material can use the master keying material to decrypt data encrypted by a second slave dongle containing the same master keying material.

A dongle is typically a portable piece of hardware that connects to another device to provide that other device with additional functionality. For example, one known type of dongle is a USB memory dongle that allows for data to be transferred between devices via the dongle. Another type of dongle is a data encryption dongle for encrypting data being stored on the dongle or being stored on an external memory. Such dongles are produced by iStorage Limited of the United Kingdom under the trade name Datashur®.

WO 2009/136161 discloses a prior art dongle for hardware encryption of data as it passes through the dongle. The slave dongle(s) of the present method may be arranged to operate in a similar fashion. The, or each, slave dongle may hence be a dongle containing memory such as flash memory. The dongles may include a USB connection for joining the dongles to the data transfer system. USB is a commonly used standard for transferring data between devices. Therefore, dongles that can connect via USB to a generic computing device (desktop computer, laptop computer, tablet, smartphone etc.) will be widely useable.

The above method prevents other programs on the data transfer system (or its operating system) from seeing the master keying material in an unencrypted form. Usually, when data is passed from one program to another program in a computer (for example, copying text from Notepad to MS Word) the data is not encrypted by either program and thus the unencrypted data may potentially available to other programs (e.g. malicious programs). By contrast, the above method ensures that the unencrypted master keying material is only ever present inside the master keying material source and inside the slave dongle. Thus, unless the master keying material or the slave dongle is directly compromised, or the encryption is broken (e.g. by a brute-force attack), there is no way for an eavesdropper to gain access to the unencrypted master keying material.

The master keying material may be a master encryption key.

The master keying material source may have a public key for the purposes of generating a session key for communication with the slave dongle. The slave dongle and master keying material source may be preprogrammed with an algorithm for producing a session key that is based upon, at least, both the slave dongle's public key and the master keying material source's public key. The master keying material source may send its public key to the slave dongle. Either of the slave dongle and the master keying material source may additionally send associated secrets, along with its respective public key. Once both the slave dongle and master keying material source have exchanged the public keys and any associated secrets, they may both generate the same session key based on the public keys and the associated secrets using the algorithm. The master keying material source may then use the session key to encrypt the master keying material which is then sent to the slave dongle. The slave dongle may then decrypt the master keying material using the session key.

Thus, in an embodiment, the step of encrypting the master keying material at the master keying material source may comprise using the slave dongle's public key to encrypt the master keying material; and the step of decrypting the encrypted master keying material may comprise decrypting the encrypted master keying material with the slave dongle's private key at the slave dongle.

Thus, in an alternative embodiment, the master keying material source may have a master keying material source public key and the master keying material source and slave dongle may each contain the same algorithm; the method may further comprise the steps of the master keying material source sending the master keying material source public key to the slave dongle, and both the slave dongle and the master keying material source generating a session key based on the public keys using the algorithm such that both the slave dongle and the master keying material source generate the same session key; wherein the step of decrypting the encrypted master keying material comprises decrypting the encrypted master keying material with the session key.

As such, in the method of the first aspect, the encryption process may incorporate the use of public/private key cryptography to securely transfer the master keying material or may incorporate the use of symmetric session key cryptography to securely transfer the master keying material.

The master keying material source may take the form of a software program running on the data transfer system or a firmware program stored on a dedicated chip in the data transfer system. Having the master keying material source as a software program may make it easier for the master keying material source to be distributed, as it may run on any general-purpose computer e.g. a PC. Having the master keying material source as a firmware program stored on a dedicated chip may increase the security of the master keying material.

With this method, the slave dongle's private key and the unencrypted master keying material are advantageously not seen by other parts of the data transfer system, in particular by any malicious hardware or software. The method thus allows the secure production of one or more slave dongle(s) that contain the master keying material and hence allows for secure production of a set of slave dongles that share the same master keying material. The slave dongles may then provide a secure dongle-based symmetric key system.

A slave dongle carrying such master keying material is useful as it allows users to readily transfer the dongle between various devices (e.g. from their work desktop to a home computer) and to maintain secure access to encrypted data. In particular, the dongle(s) may be used to access encrypted data stored in remotely accessible memory such as in the "cloud" so that a single secure data store can be accessed securely from any location.

The method may include transferring the master keying material to a plurality of slave dongles using the same method as set out in the first aspect. Thus, each one of multiple slave dongles can be securely programmed with the same master keying material. This allows a plurality of users, each having a slave dongle, to securely communicate data to one another using the master keying material.

In this context, an encryption key or keying material may be a random string of bits created explicitly for scrambling and unscrambling data (i.e. encrypting and decrypting data). Encryption keys are usually designed using algorithms that are intended to ensure that every key is unpredictable and unique. Thus, the master keying material, the slave dongle public key and/or the slave dongle private key may be a data string created for encrypting and decrypting data. The key(s) may have a length of 256 bytes (2048 bits) or more.

The master keying material may be randomly generated when the master keying material source is first used, e.g. using a FIPS random number generator. In this manner, the manufacturer of a master keying material source does not know the master keying material since it may be generated by a user having the master keying material source. This ensures that there is no central repository of master keying materials that is vulnerable to hacking or theft. Further, it gives the user confidence that their encrypted communications cannot be decoded by the manufacturer.

Before the step of transferring the slave dongle's public key to the master keying material source in the data transfer system, the method may comprise the step of unlocking the slave dongle using via a slave dongle user authentication system, wherein unlocking the slave dongle allows the slave dongle to send and receive data, in the case where the slave dongle is not factory reset.

This may enhance security by preventing an unauthorised user from tampering with the data on the slave dongle. An authorised user must have suitable credentials for unlocking the user authentication system of the slave dongle before that user can use the slave dongle. A factory reset slave dongle does not contain any master keying material. It would be time consuming for an administrator to unlock every factory-reset slave dongle before transferring the master keying material to the slave dongle. Thus, avoiding the need for user authentication when handling factory-reset slave dongles can save time.

The slave dongle user authentication system may comprise a code entry system, such as a keypad, and/or a biometric sensor on the slave dongle.

The slave dongle(s) may hence be configured to identify an authorised user by comparison of data obtained by the user authentication system with data stored on the dongle relating to authorised users. In the case of a keypad entry system (e.g. for entering a code such as a PIN or entering a password), the slave dongle may allow access at a normal level or an administrator level upon access of the correct PIN/password. In the case of a biometric system, the slave dongle may allow access to one or more users previously enrolled with the slave dongle. The slave dongle may be arranged to enroll users in any suitable manner, and it may be supplied to the first user in an enrolment mode allowing the first user to enroll their own biometric information and/or their own PIN/password, with the first user optionally having administrator level access. Administrator level access may permit the enrolment of new or additional users to the user authentication system.

The method may comprise the step of unlocking the master keying material source via a master keying material source user authentication system, wherein unlocking the master keying material source allows data to be sent to and received from the master keying material source.

This may enhance the security of the master keying material by preventing an unauthorised user from accessing the master keying material source. Unlocking the master keying material source may include entering a code such as a password or a PIN into the data transfer device, or providing biometric information via a suitable sensor. When the master keying material source is locked, the master keying material may be stored in encrypted form, and unlocking the master keying material source may involve decrypting the master keying material.

The method may comprise: scrambling the slave dongle's public key using a predetermined scrambling algorithm prior to transferring the slave dongle's public key, and unscrambling the slave dongle's public key at the master keying material source after transferring the slave dongle's public key and prior to encrypting the master keying material.

In this case the slave dongle(s) may include a suitable scrambling algorithm and the master keying material source may include instructions for unscrambling the scrambled slave dongle's public key. This helps to protect against the case where the data transfer system is compromised and the malicious user has emulated a slave dongle but generated his own public key that is sent to the master keying material source for the purposes of discovering the master keying material.

With the added use of scrambling of the slave dongle public key, only the legal slave dongles know the scrambling algorithm and this may be hard-coded onto the dongles, e.g. at the factory when first produced. Optionally only the master keying material source includes the instructions needed to unscramble the slave dongle public key. This provides a further layer of security against malicious emulated slave dongles, because the hacker has no knowledge of the scrambling algorithm as this is never transferred over the data transfer system, and may only ever be present on the master keying material source, where it may be protected via a suitable user authentication system as discussed above. In a case where the length of the public key is 256 bytes (2048 bits), to brute-force crack the scrambling algorithm, an attacker must try 256! times to hack the scrambling algorithm.

A plurality of slave dongles may be provided, each having a respective public key and a respective private key; and the method may comprise, for each slave dongle in turn: transferring the slave dongle's public key to the master keying material source; encrypting the master keying material with the slave dongle's public key using the master keying material source; transferring the encrypted master keying material to the slave dongle; and decrypting the encrypted master keying material with the slave dongle's private key at the slave dongle.

This provides the advantage of rapidly producing a plurality of slave dongles that can be distributed to a plurality of users for the purposes of securely sharing information encrypted with the master keying material.

According to another aspect, there is provided method of sharing data securely between authorised computing devices, wherein: a first computing device is connected to a first slave dongle and a second computing device is connected to a second slave dongle, the first and second slave dongles having been programmed with the same master keying material by any of the methods described above, the method comprising: encrypting first data using the first slave dongle with the master keying material stored in the first slave dongle; transferring the encrypted first data, optionally across a network, to the second computing device; decrypting the encrypted first data using the second slave dongle; and transferring the unencrypted first data from the second slave dongle to the second computing device.

This allows users to securely communicate data across potentially-insecure channels (e.g. the internet) using the slave dongles. The slave dongles have each securely received the same master keying material and thus the users can have greater confidence that their communications utilising the slave dongles are indeed secure.

According to another aspect, there is provided a system for securely transferring master keying material between a master keying material source and a slave dongle, the system comprising: a data transfer system containing a master keying material source having master keying material; and a slave dongle containing a slave processor, a slave public key and a slave private key; wherein the data transfer system has at least one port for connecting to the slave dongle; the data transfer system being configured to transfer the slave dongle's public key to the master keying material source; the master keying material source being configured to encrypt the master keying material via an encryption process incorporating the use of the slave dongle's public key to produce an encrypted master keying material; the data transfer system being configured to transfer the encrypted master keying material to the slave dongle; and the slave dongle being configured to decrypt the encrypted master keying material and to store the master keying material at the slave dongle such that a user of the slave dongle can use the master keying material to decrypt data encrypted by the same slave dongle or another slave dongle having the same master keying material With this system, the slave dongle's private key and the unencrypted master keying material are advantageously not seen by other parts of the data transfer system, in particular by any malicious hardware or software. The system thus allows the secure production of one or more slave dongle(s) that contain the master keying material and hence allows for secure production of a set of slave dongles that share the same master keying material. The slave dongles may then provide a secure dongle-based symmetric key system.

The master keying material source may be held by a software program installed on the data transfer system, or the master keying material source may be held by firmware on a chip in the data transfer system.

The slave dongle may comprise a slave dongle user authentication system, wherein the slave dongle is configured to require an authorisation code input at a slave dongle user authentication system before allowing transfer of data to or from the slave dongle, in a case where the slave dongle is not factory reset. This may enhance security by preventing an unauthorised user from tampering with the data on the slave dongle.

The master keying material source may comprise a master keying material source user authentication system, wherein the master keying material source is configured to require an authorisation code input into the data transfer system before allowing transfer of data to or from the master keying material source.

This may enhance security by preventing an unauthorised user from tampering with the data in the master keying material source.

The master keying material source may be configured to generate random keying material when the master keying material source is first used. For example, the master keying material may be generated using a FIPS random number generator. This may provide the advantage of the manufacturer not knowing the master keying material, i.e. because it is generated once the master keying material has left the manufacturer's control, increasing the security for the user.

The slave dongle may be configured to scramble the slave dongle's public key using a predetermined scrambling algorithm prior to transferring the slave dongle's public key, such that the data transfer system transfers a scrambled slave dongle's public key; and the master keying material source may contain the scrambling algorithm and be configured to unscramble the scrambled slave dongle's public key prior to encrypting the master keying material.

Other programs on the data transfer system have no knowledge of the scrambling algorithm. This provides a further layer of security against malicious emulated slave dongles, because the hacker has no knowledge of the scrambling algorithm as this is not contained in, nor ever transferred over, the data transfer system.

The system may comprises a plurality of slave dongles, each having a respective public key and a private key; and the data transfer system may contain at least two ports, wherein the at least two ports are for connecting to at least two of the plurality of slave dongles; wherein the system is configured to securely transfer the master keying material to each slave dongle in turn.

A system according to this arrangement can quickly prepare a plurality of slave dongles, without the user having to remove each slave dongle after it receives the master keying material and attach a new slave dongle to the data transfer system.

According to another aspect, there is provided a system for securely communicating data between users, the system comprising: a first computing device coupled to a first slave dongle, a second computing device coupled to a second slave dongle, wherein the slave dongles have been configured using any of the aforementioned methods or wherein the master and slave dongles have been configured by any of the aforementioned systems; wherein, when the first computing device is used to send first data to the second computing device, the first computing device is configured to send the first data to the first slave dongle, the first slave dongle is configured to encrypt the first data using the master keying material, and the first device is configured to send the encrypted first data to the second computing device, optionally via a network, and wherein the second computing device is configured to receive the first encrypted data and send the first encrypted data to the second slave dongle, the second slave dongle is configured to decrypt the first encrypted data using the master keying material and to send the decrypted first data to the second computer device.

This system allows users to communicate securely with one another using symmetric-key encryption which is faster than public-key encryption. Further, as the disclosure provides a secure method for providing the master keying material to users, a known disadvantage of symmetric-key encryption regarding the initial transfer of the master keying material is overcome.

Each slave dongle may be configured to require a user identification to unlock the slave dongle for use. This may enhance the security of the system by preventing a user who has access to a slave dongle (e.g. by theft or having found a lost slave dongle) from using the slave dongle.

Each slave dongle may have a plurality of buttons and the user identification may be a code to be input by pressing the buttons in a predetermined order.

The system may further comprise a server, wherein each slave dongle is configured to have an identification and configured to require an authorisation code from the server in order to perform encryption and decryption, and wherein the server is configured to have a whitelist or a blacklist of slave dongle identifications such that unauthorised slave dongles having the master keying material are excluded from communicating with authorised slave dongles having the master keying material.

This may enhance the security of the system by allowing centralised control of which slave dongles are allowed to use the master keying material. If a given slave dongle is lost, stolen, or otherwise misused, a server administrator can readily prevent that slave dongle from being used.

Certain embodiments of the present disclosure will now be described in greater detail by way of example only and with reference to the accompanying drawings in which.

Figure 1:
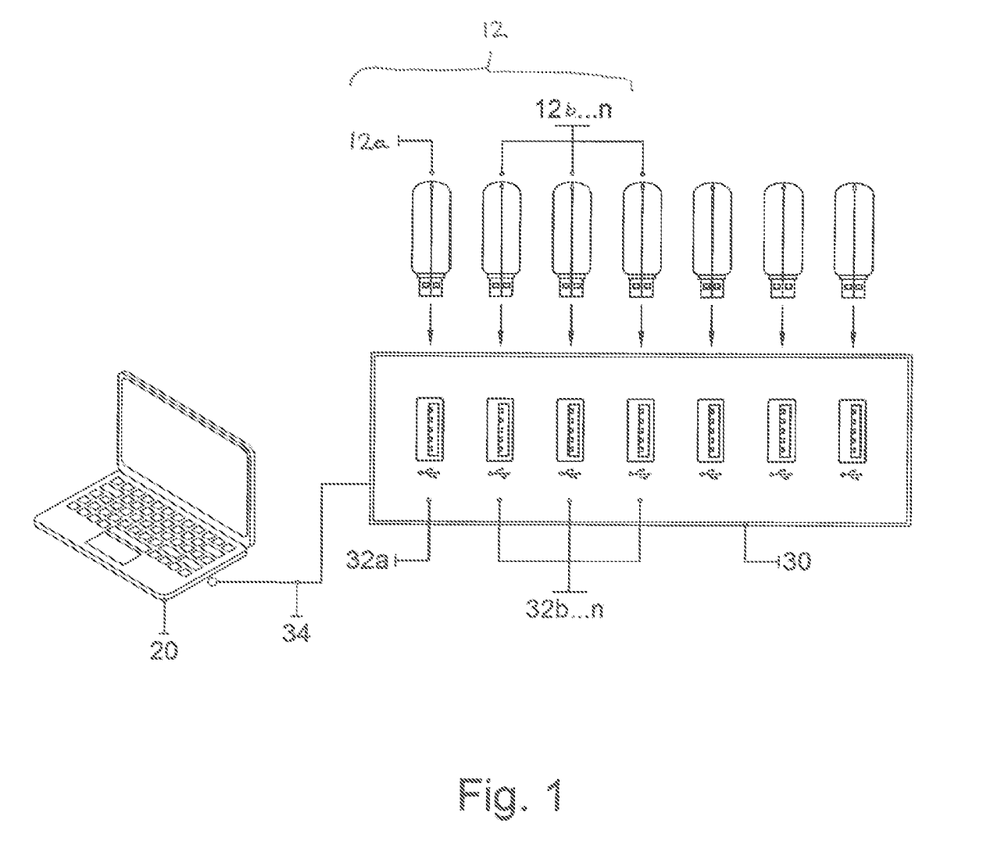
FIG. 1 shows a computer connected to several slave dongles.

FIG. 1 shows a computer 20 and a hub 30 plugged into the computer, via a cable 34, and a plurality of slave dongles 12. A first slave dongle 12a of the plurality of slave dongles 12 is plugged into a first port 32a on the hub 30. Further slave dongles 12b-n may be plugged into other ports 32b-n on the hub 30.

The hub 30 may be any standard USB hub, or a hub with another type of port (e.g. FireWire™). Alternatively, one, several or all of the slave dongles 12 may be attached directly to ports in the computer 20, without the use of a hub 30.

The above described system, comprising the computer 20 and dongles 12 is for securely transferring master keying material from a master keying material source running on the computer 20 to the slave dongle(s) 12a-n. This allows production of a number of slave dongles 12 that all share the same master keying material. For example, all slave dongles 12 that belong to the same company or working group may use the same master keying material for encryption and decryption when transferring data to one another within the company or working group.

The master keying material may be a master encryption key.

The computer 20 is just one example of a generic data transfer system allowing communication between the master keying material source and the slave dongle(s) 12.

However, it is to be understood that other forms of data transfer system may be used.

For example, the data transfer system may be a dedicated device 40 as described below in conjunction with FIG. 3.

When the master keying material source is first used on the data transfer device, master keying material may be randomly generated by a FIPS approved Random Number Generator and this is stored in an encrypted form in the data transfer system.

Each slave dongle 12a-n has a unique public/private key pair, suitable for use in public key cryptography. As is well understood in public key cryptography, the public key may be publicly shared and seen by others, both friendly and unfriendly. The private key is kept secret and may be used to decrypt data that has been encrypted using the public key. Each slave dongle 12 may contain an algorithm for generating a session key based on given inputs.

The computer 20 may run software in the form of a master keying material source that is designed for securely transferring the master keying material to each of the slave dongles 12a-n in turn. The master keying material source may be a program held on the computer, e.g. installed on a hard drive. Alternatively, the master keying material source may be a firmware program held on a dedicated chip in the computer 20. These slave dongles 12a-n may then be distributed to e.g. workers in a company or working group for use with their own devices (e.g. PC, laptop, tablet, phone etc.) to allow these devices to securely communicate with one another using the master keying material.

Figure 2A:
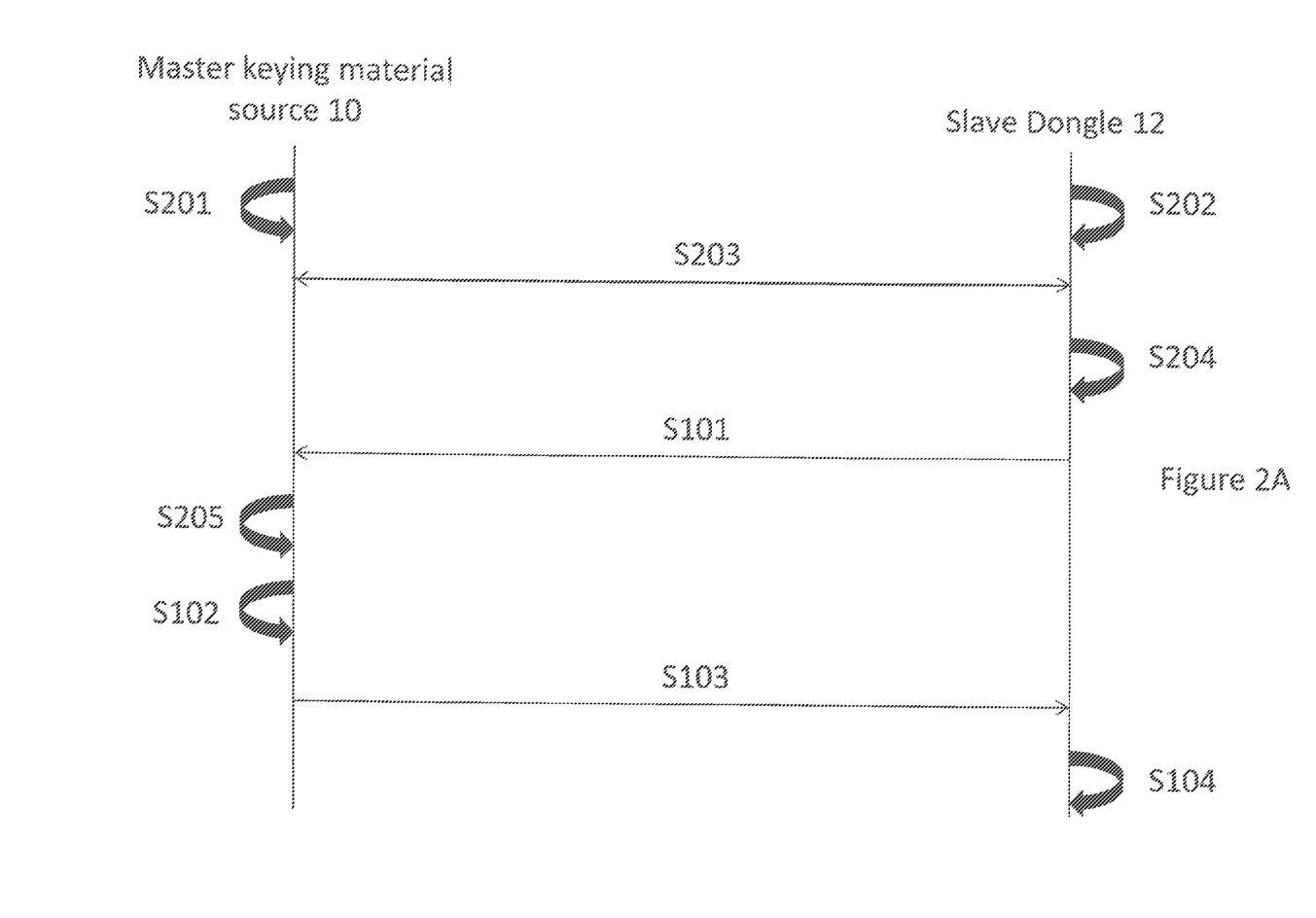
FIG. 2A shows a sequence diagram of method steps for securely transferring master keying material to a slave dongle using the slave dongle's public/private key pair.

FIG. 2A shows a sequence diagram showing one method by which the master keying material may be securely transferred to each slave dongle 12a-n.

The process optionally begins with one or more of steps 201-205, in any order.

Optional step 201 is a step of unlocking the master keying material source so that it is allowed to transfer data to, or receive data from, a slave dongle 12, e.g. by entering a code on the computer 20 or dedicated device 40.

Optional step 202 is a step of unlocking the slave dongle, e.g. by entering a code into a keypad on the slave dongle 12 or by providing suitable biometric data to a biometric sensor on the slave dongle 12. Unlocking the slave dongle allows the slave dongle to send and receive data, in the case where the slave dongle is not factory reset.

The slave dongles 12 may be configured such that a code or biometric data is not required when the slave dongles are factory reset (i.e. in a state where the slave dongle 12 does not contain master keying material), which may speed up the process of transferring the master keying material to the slave dongles 12.

Optional step 203 is a step of mutual authentication between the master keying material source 10 and the slave dongle 12 to verify each other's identities.

Optional step 204 is a step of the slave dongle scrambling its public key (before sending it to the master keying material source) with a predetermined scrambling algorithm Optional step 205 is a step of the master keying material source unscrambling the scrambled public key. Steps 204 and 205 go together such that if step 204 is performed then step 205 must also be performed.

Steps 101 to 104 demonstrate the steps of securely transferring master keying material between the master keying material source 10 and a slave dongle 12 in this example.

Step 101: The slave dongle's public key (optionally scrambled—see step 204) is transferred to the master keying material source 10.

Step 102: The master keying material source 10 encrypts the master keying material using the slave dongle's public key.

Step 103: The master keying material source 10 sends the encrypted master keying material to the slave dongle 12.

Step 104: The slave dongle 12 stores the master keying material (either in encrypted or decrypted form) and is able to decrypt the encrypted master keying material using the slave dongle's private key when required.

The above method steps 101-104 (and optionally including one or more of steps 201-205) ensures that the master keying material is only unencrypted inside the master keying material source and inside the slave dongle 12. The slave dongle 12 may store the master keying material in encrypted form and only decrypt it when the master keying material is required for providing secure communication between a plurality of users having the slave dongles 12a-n.

Figure 2B:
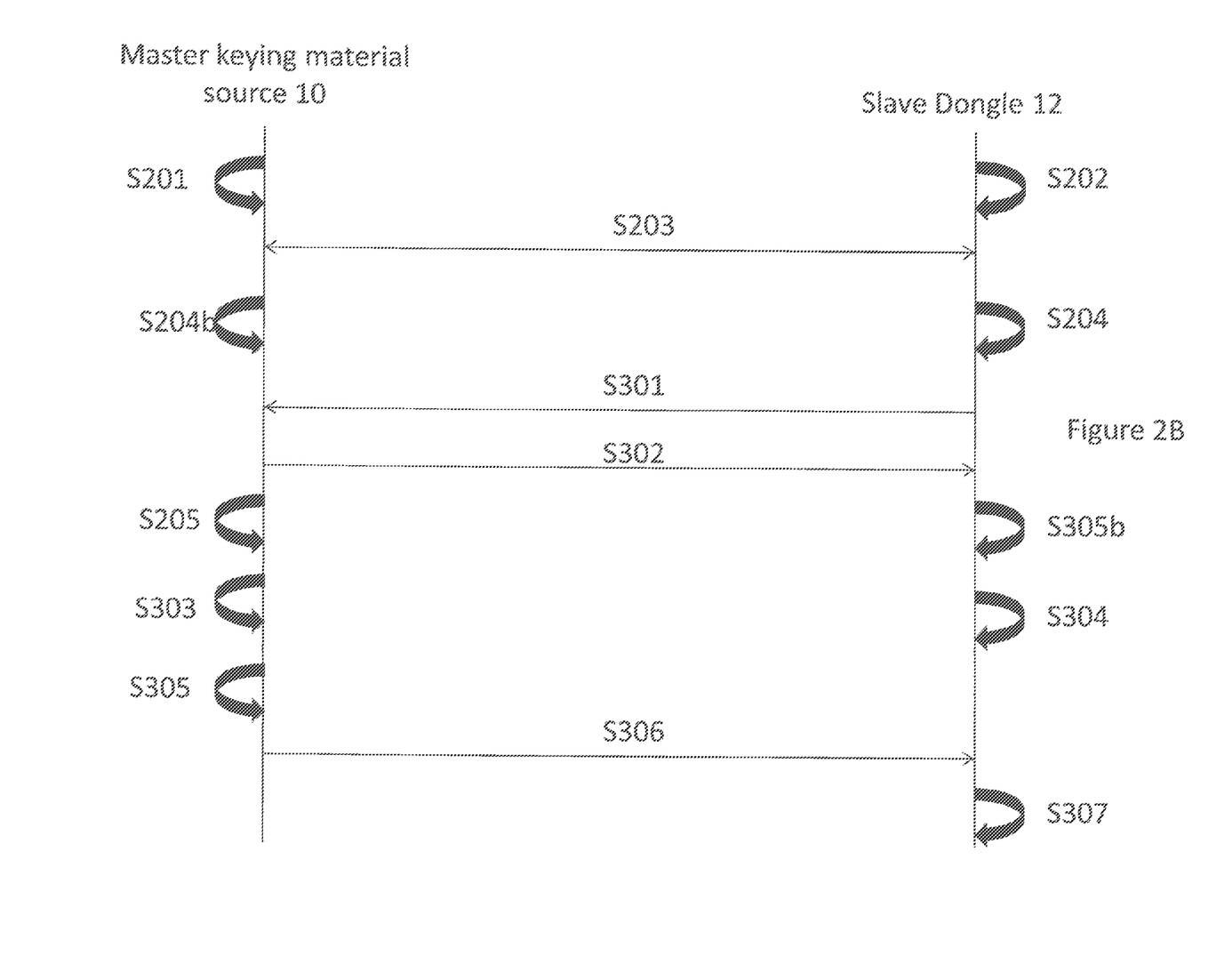
FIG. 2B shows a sequence diagram of method steps for securely transferring master keying material to a slave dongle using a session key.

FIG. 2B shows a sequence diagram of another method by which the master keying material may be securely transferred to each slave dongle 12a-n. In this example, both the master keying material source and slave dongle contain the same algorithm for generating a session key from given inputs and the master keying material is encrypted/decrypted using the session key.

The process optionally begins with one or more of steps 201-205b, in any order. In this embodiment, the optional steps 201-205 are the same as described above for FIG. 2A.

Additionally, at optional step 204b, the master keying material source may scramble its public key (before sending it to the slave dongle). At optional step 205b, the slave dongle may unscramble the master keying material source's public key. Steps 204b and 205b go together such that if step 204b is performed then step 205b must also be performed.

Step 301: The slave dongle sends its public key to the master keying material source.

Step 302: The master keying material source sends its public key to the slave dongle.

Note, steps 301 and 302 may be performed in either order or simultaneously.

Steps 303: The master keying material generates a session key based on the slave dongle's public key and the master keying material source's public key.

Steps 304: The slave dongle generates the same session key based on the slave dongle's public key and the master keying material source's public key.

Note, steps 303 and 304 may be performed in either order or simultaneously.

Step 305: The master keying material source 10 encrypts the master keying material using the session key.

Step 306: The master keying material source 10 sends the encrypted master keying material to the slave dongle 12.

Step 307: The slave dongle 12 stores the master keying material (either in encrypted or decrypted form) and is able to decrypt the encrypted master keying material using the session key when required.

Figure 3:
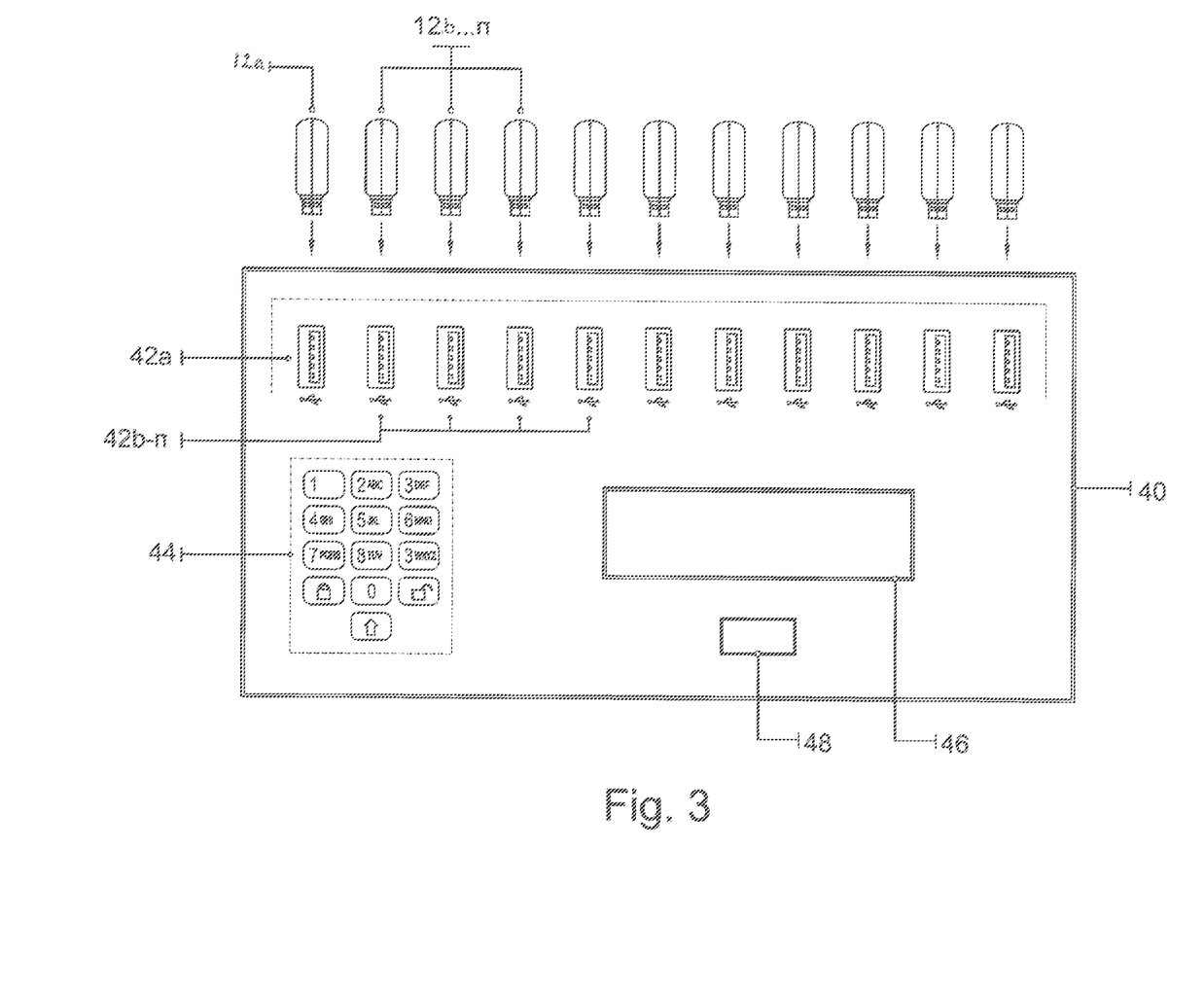
FIG. 3 shows a dedicated device for accepting a master dongle and a plurality of slave dongles.

FIG. 3 shows an alternative system for securely transferring master keying material to the slave dongle(s) 12a-n. In this system, a dedicated device 40 is provided for performing the above method steps 101-105. That is, the dedicated device 40 is the data transfer system in this example and the master keying material source is installed on the dedicated device. Optionally, the master keying material source is held as a firmware program on a secure chip to protect against physical tampering by an intruder to gain illicit access to the master keying material.

The dedicated device 40 contains a plurality of ports 42a-n for connecting to one or more of the slave dongles 12a-n.

The dedicated device further comprises a set of control keys 44, a display device 46, and a control button 48.

The control keys 44 may comprise a numeric keyboard with numbers 0 to 9, a lock button, an unlock button, and an arrow button. The dedicated device 40 may optionally require a code to unlock the device (i.e. step 201) before it will perform the method steps 101-104. The lock button may be used to re-lock the dedicated device 40 after use, to prevent unauthorized users making their own slave dongles 12.

The display screen may be a LCD screen for displaying messages to a user, such as "Locked", "Unlocked", "Ready to transfer" etc.

Pressing the copy button 48 may cause the dedicated device 40 to start securely transferring the master keying material from the master keying material source to the slave dongle(s) 12a-n plugged into the port(s) 42a-n.

When multiple slave dongles 12a-n are plugged into the dedicated device 40, the dedicated device 40 may perform the method steps for each slave dongle 12 in turn. That is, steps 101 to 104 are performed for a first slave dongle 12a, and once complete, steps 101-104 are performed for a second slave dongle 12b etc.

Similarly, when multiple slave dongles 12a-n are plugged into the computer 20 (or generally, into the data transfer system), the computer 20 may perform the method steps 101-104 for each slave dongle 12 in turn. That is, steps 101 to 104 are performed for a first slave dongle 12a, and once complete, steps 101-109 are performed for a second slave dongle 12b etc.

Once a plurality of slave dongles 12a-n have the master keying material stored thereon, the slave dongles 12a-n may be distributed to a number of users, e.g. employees or member of a working group to allow them to securely exchange data with one another.

Figure 4:
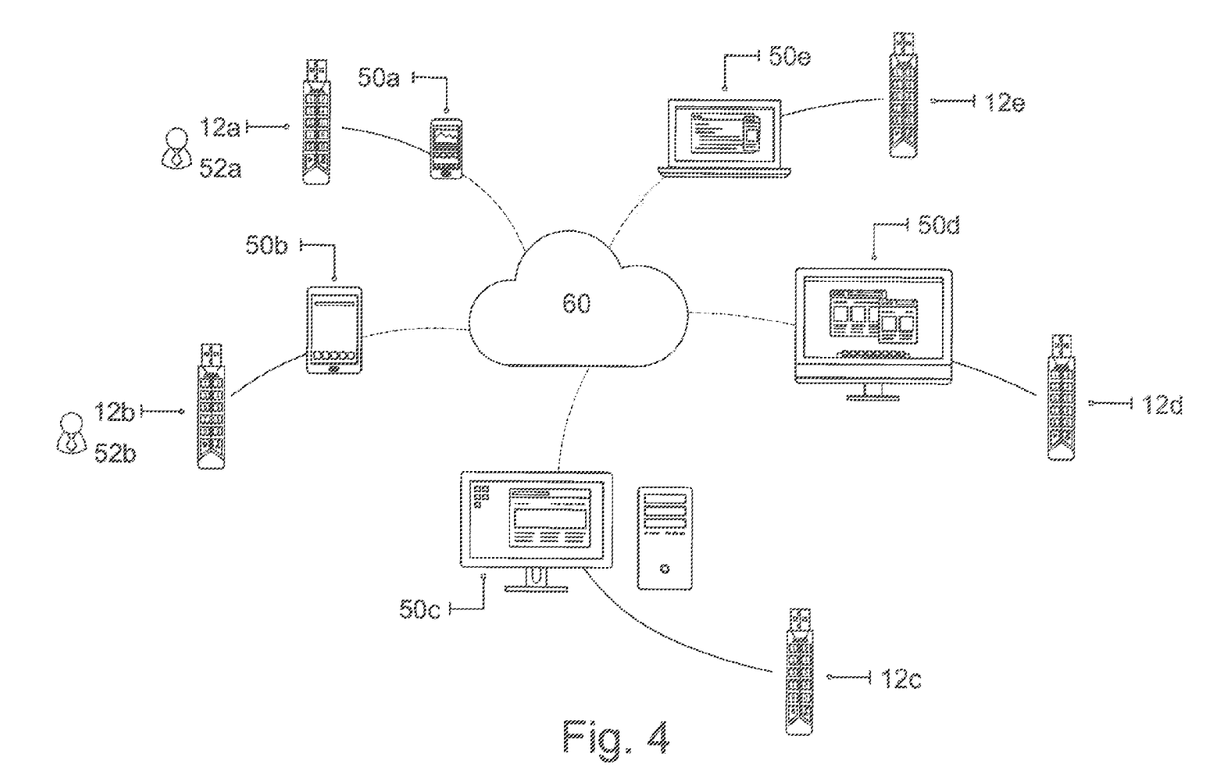
FIG. 4 shows a system of multiple devices, each device having a slave dongle, wherein users can communicate securely with one another over a network using common master keying material.

FIG. 4 shows a schematic diagram in which multiple users may communicate with one another via a network 60 (e.g. via the cloud), using multiple different devices 50a-e. The devices 50a-e may be any of a desktop computer, a tablet computer, a smartphone, a laptop computer and/or any other commonly used computing device capable of connecting to a slave dongle 12.

A respective slave dongle 12a-e is plugged into each device 50a-e. Each slave dongle 12a-e has been prepared with the same master keying material by the method shown above. When a first user 52a wants to share data with another user 52b, the first user 52a instructs his device 50a to send the data to the other user 52b via the network 60. The slave dongle 12a of the first user 52a encrypts the data using the master keying material. The data is then sent via the network 60 to the second user 52b. The second user's device 50b receives the encrypted data and passes it to the second slave dongle 12b. The second slave dongle 12b then decrypts the data using the master keying material and returns the unencrypted data to the second user's device 50b.

In this arrangement, the master keying material is never read by or transferred onto the devices 50a-e, nor is it seen by the network 60. Instead, the master keying material is only ever present on a secure processor in each of the slave dongles 12a-e. Thus, if the network 60 security is compromised, an eavesdropper/hacker will only ever see encrypted data.

Further, if the security of one or more of the devices 50a-e is compromised, the eavesdropper/hacker will only ever see the encrypted and unencrypted data on that device but will not thereby gain access to the master keying material and thus will not be able to compromise the whole network.

Consequently, the compromised device may be repaired/re-secured (e.g. by running an anti-virus program or similar) without requiring that new master keying material is prepared and delivered to each user on a new slave dongle 12.

Further, each slave dongle 12a-n may be configured to contact a server and provide an identification to the server whenever a user wishes to encrypt/decrypt data using the master keying material. The server may maintain a whitelist and/or blacklist of slave dongles 12. When a given slave dongle 12 contacts the server, the server is configured to check, based on the whitelist or blacklist, whether that slave dongle is authorized to use its master keying material. If the slave dongle is not authorized, the server may prevent the slave dongle 12 from using its master keying material to perform encryption/decryption.

The invention claimed is:

1. A method of securely transferring master keying material between a master keying material source and a first slave dongle of a plurality of slave dongles:
    connecting the first slave dongle to a data transfer system that contains the master keying material source, wherein the first slave dongle contains a public key and a private key, the master keying material provides master keying material and the master keying material allows users of the each slave dongle to securely access encrypted data;
    unlocking the first slave dongle via a slave dongle user authentication system upon receiving input comprising a user identification, wherein unlocking the first slave dongle allows the first slave dongle to send and receive data when the first slave dongle is not factory reset;
    transferring the public key of the first slave dongle to the master keying material source using the data transfer system;
    encrypting the master keying material via an encryption process at the master keying material source, with the encryption process incorporating the use of the public key of the first slave dongle and producing encrypted master keying material at the master keying material source;
    transferring the master keying material to the first slave dongle using the data transfer system;
    decrypting the encrypted master keying material at the first slave dongle;
    storing the master keying material at the first slave dongle such that a user of the first slave dongle containing the master keying material uses the master keying material to decrypt data encrypted by a second slave dongle containing the same master keying material, wherein an authorization code is required to be received from a server for each of the plurality of slave dongles prior to permitting each of the plurality of slave dongles to encrypt and decrypt data;
    identifying, by the server, whether any of the plurality of slave dongles are in a whitelist or blacklist of slave dongle identifications; and
    preventing, by the server, communications between slave dongles from the plurality of slave dongles that have received an authorization code and slave dongles on the blacklist.

2. The method of claim 1, wherein the step of encrypting the master keying material at the master keying material source comprises using the public key of the first slave dongle to encrypt the master keying material; and
    wherein the step of decrypting the encrypted master keying material comprises decrypting the encrypted master keying material with the private key of the first slave dongle at the slave dongle.

3. The method of claim 1, wherein the master keying material source has a master keying material source public key and the master keying material source and the first slave dongle each contain the same algorithm;
    further comprising the steps of the master keying material source sending the master keying material source public key to the first slave dongle, and
    both the first slave dongle and the master keying material source generating a session key based on the public key of the first slave dongle and the master keying material source public key using the algorithm such that both the first slave dongle and the master keying material source generate the same session key;
    wherein the step of decrypting the encrypted master keying material comprises decrypting the encrypted master keying material with the session key.

4. The method of claim 1, wherein the master keying material source is held by a software program installed on the data transfer system, or wherein the master keying material source is held by a firmware program on a dedicated chip in the data transfer system.

5. The method of claim 1, wherein the master keying material is randomly generated when the master keying material source is first used, preferably wherein the master keying material is generated using a Federal Information Processing Standards (FIPS) random number generator.

6. The method of claim 1, wherein the slave dongle user authentication system comprises a keypad entry system and/or a biometric sensor on the slave dongle.

7. The method of claim 1, comprising the step of unlocking the master keying material source via a master keying material source user authentication system, wherein unlocking the master keying material source allows data to be sent to and received from the master keying material source.

8. The method according to claim 1, comprising:
scrambling the public key of the first slave dongle using a predetermined scrambling algorithm prior to transferring the public key of the first slave dongle, and
unscrambling the public key of the first slave dongle at the master keying material source after transferring the public key of the first slave dongle prior to encrypting the master keying material.

9. The method according to claim 1, wherein the method further comprises performing the following for each slave dongle of the plurality of slave dongles:
transferring a respective public key of a slave dongle from the plurality of slave dongles to the master keying material source, wherein each slave dongle from the plurality of slave dongles has a respective public key and a respective private key;
encrypting the master keying material using the master keying material source;
transferring the encrypted master keying material to the slave dongle; and
decrypting the encrypted master keying material at the slave dongle.

10. The method of claim 1, wherein the method further comprises:
encrypting first data using the first slave dongle with the master keying material stored in the first slave dongle, wherein the first slave dongle is connected to a first computing device and the second slave dongle is connected to a second computing device;
transferring the encrypted first data, across a network, to the second computing device;
decrypting the encrypted first data using the second slave dongle; and
transferring the unencrypted first data from the second slave dongle to the second computing device.

11. A system for securely transferring master keying material between a master keying material source and a first slave dongle of a plurality of slave dongles, the system comprising:
a data transfer system containing a master keying material source having master keying material; and
a first slave dongle of the plurality of slave dongles containing a slave processor, memory, a slave public key and a slave private key and a slave dongle user authentication system, wherein the first slave dongle requires input of a user identification at the slave dongle user authentication system before allowing transfer of data to or from the first slave dongle when the first slave dongle is not factory reset;
wherein the data transfer system has at least one port for connecting to the first slave dongle;
wherein the data transfer system is configured to transfer the public key of the first slave dongle to the master keying material source;
wherein the master keying material source is configured to encrypt the master keying material via an encryption process incorporating the use of the public key of the first slave dongle to produce an encrypted master keying material;
wherein the data transfer system is configured to transfer the encrypted master keying material to the first slave dongle;
wherein the slave dongle is configured to decrypt the encrypted master keying material and to store the master keying material at the first slave dongle such that a user of the first slave dongle uses the master keying material to decrypt data encrypted by the same first slave dongle or a second slave dongle of the plurality of slave dongles having the same master keying material, wherein an authorization code is required to be received from a server for each of the plurality of slave dongles prior to permitting each of the plurality of slave dongles to encrypt and decrypt data;
identifying, by the server, whether any of the plurality of slave dongles are in a whitelist or blacklist of slave dongle identifications; and
preventing, by the server, communications between slave dongles from the plurality of slave dongles that have received an authorization code and slave dongles on the blacklist.

12. The system of claim 11, wherein the master keying material source has a master keying material source public key and an algorithm, and wherein the first slave dongle has the same algorithm; and
wherein the master keying material source is configured to send the master keying material source public key to the first slave dongle, both the first slave dongle and the master keying material source are configured to generate a session key based on the public key of the first slave dongle and the master keying material source public key using the algorithm such that the first slave dongle and the master keying material source generate the same session key; and
the slave dongle is configured to decrypt the encrypted master keying material with the session key.

13. The system of claim 11, wherein the master keying material source comprises a master keying material source user authentication system, wherein the master keying material source is also configured to require an authorization code input into the data transfer system before allowing transfer of data to or from the master keying material source.

14. The system according to claim 11, wherein the first slave dongle is configured to scramble the public key of the first slave dongle using a predetermined scrambling algorithm prior to transferring the public key of the first slave dongle, such that the data transfer system transfers a scrambled public key of the first slave dongle; and
the master keying material source contains the scrambling algorithm and is configured to unscramble the scrambled public key of the first slave dongle prior to encrypting the master keying material.

15. The system of claim 11, further comprising:
sending first data from a first computing device coupled to the first slave dongle to a second computing device coupled to the second slave dongle, wherein the first computing device is configured to send the first data to the first slave dongle, the first slave dongle is configured to encrypt the first data using the master keying material, and the first computing device is configured to send the encrypted first data to the second computing device, via a network, and
wherein the second computing device is configured to receive the first encrypted data and send the first encrypted data to the second slave dongle, the second slave dongle is configured to decrypt the first encrypted data using the master keying material and to send the decrypted first data to the second computer device.

16. The system according to claim 11, wherein each slave dongle of the plurality of slave dongles is configured to require a user identification to unlock the slave dongle for use.

17. The system according to claim 16, wherein each slave dongle from the plurality of slave dongles has a plurality of buttons and the user identification is a code to be input by pressing the buttons in a predetermined order.

\* \* \* \* \*